Figure 1:
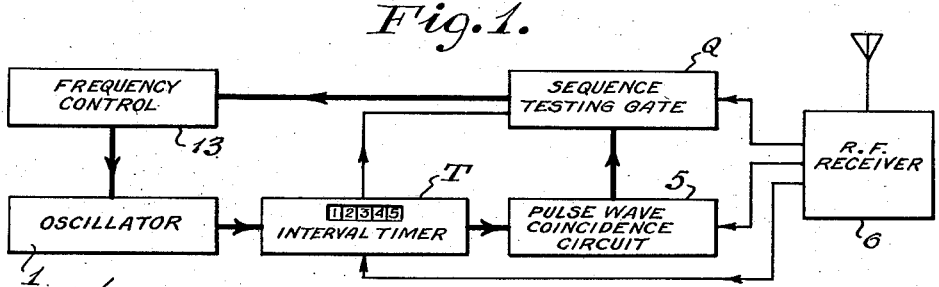

Feb. 19, 1957 — W. PALMER — 2,782,413
AUTOMATIC LORAN RECEIVER
Filed March 8, 1949 — 3 Sheets-Sheet 1

INVENTOR
WINSLOW PALMER
BY
ATTORNEY.

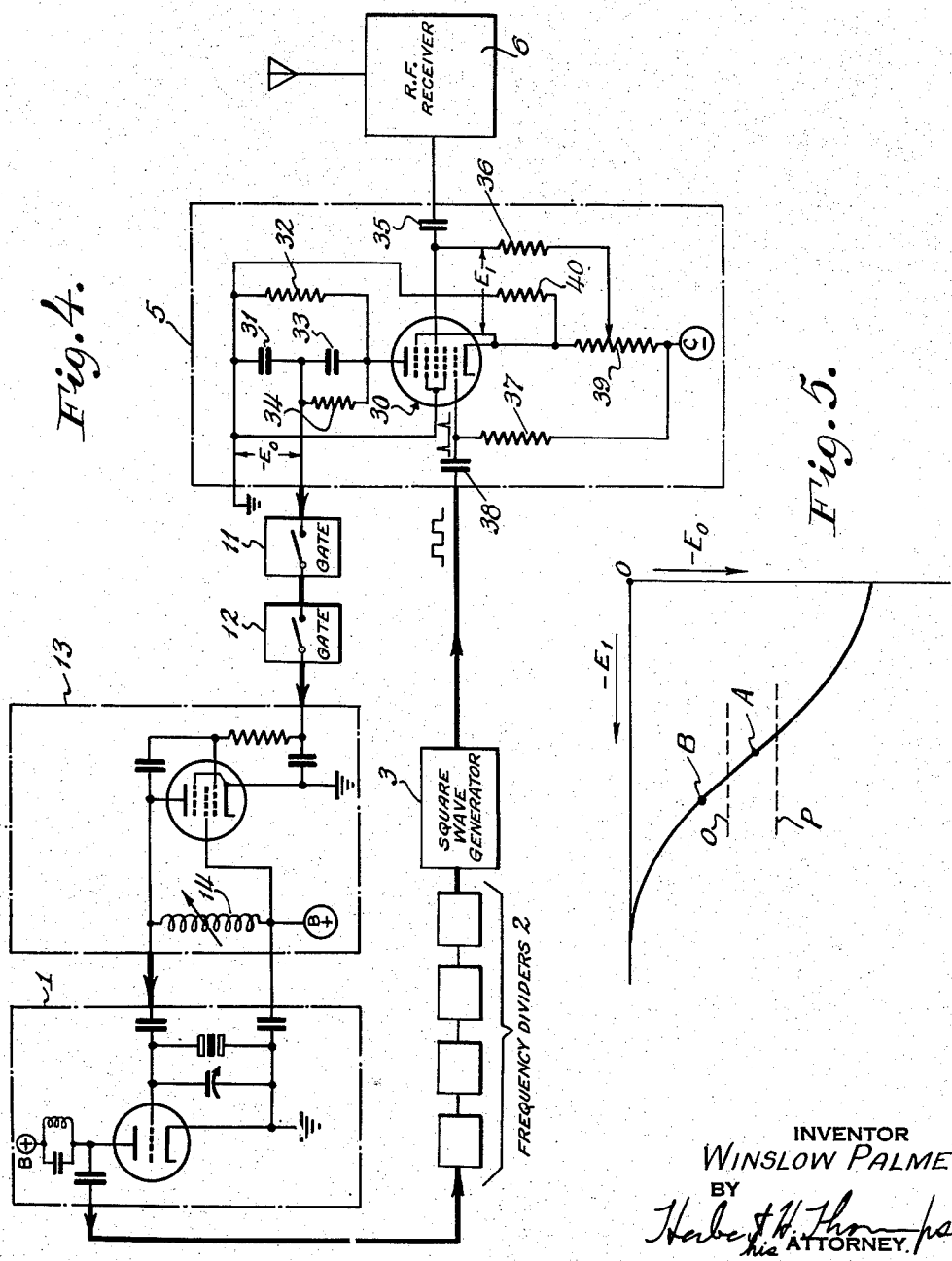

United States Patent Office 2,782,413
Patented Feb. 19, 1957

2,782,413
AUTOMATIC LORAN RECEIVER

Winslow Palmer, West Hempstead, N. Y., assignor to Sperry Rand Corporation, a corporation of Delaware Application March 8, 1949, Serial No. 80,249

18 Claims. (Cl. 343—103)

This invention relates to automatic time measurement between recurrent signals and more particularly to automatic Loran systems. This application is a continuation in part of application S. N. 633,473 for Timing Apparatus, filed December 7, 1945.

In radio navigation systems of the hyperbolic type such as Loran, the time interval between recurrent timing signals is now generally determined by a visual-manual system. This method is subject to human error by the operator and is quite time consuming, so that it is desirable to have a completely automatic system. Detailed information as to the principles and operations of Loran is given in the November and December 1945 and March 1946 issues of Electronics Magazine, and in the book "Loran" by J. A. Pierce, A. A. McKenzie, and R. H. Woodward published in 1948 by McGraw-Hill.

The present invention discloses methods and means for automatically determining the intervals between received recurrent signals. The invention will be illustrated and discussed in connection with a typical low frequency Loran triad system which is well known, although it is not limited to such use. The details of low frequency Loran are discussed on page 97 of the above cited book "Loran."

Another advantage of a completely automatic system is that it will operate on recurrent signals considerably below the noise level. It is known that due to the integrating effect in a completely automatic system that it will operate on a signal several decibels below the average value of the random noise level, which is beyond the threshold of operability of the manual-visual systems now employed. Random noise will average out without any effect in the control circuits whereas a small recurrent signal synchronous with locally generated timing pulses will, by its constancy, have a cumulative effect on the automatic controls. The invention is not limited to use in matching pulse signals, but may be used for other types of periodic signals.

Accordingly, the primary object of the invention is to provide improved means for measuring the interval between received recurrent signals.

Another object of the invention is to provide improved means for automatically measuring the interval between received recurrent signals.

Another object of the invention is to provide improved means to automatically measure Loran intervals.

Another object of the invention is to provide improved means for automatically measuring signals received from a Loran triad.

Another object of the invention is to provide improved means for measuring the intervals between recurrent signals which are below the average value of the random noise level.

Another object of the invention is to provide improved means for receiving recurrent signals below the average value of the random noise level.

Figure 2:
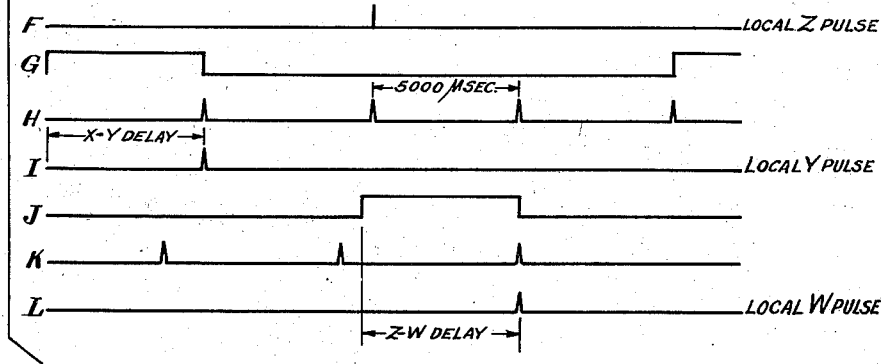
Figure 6:
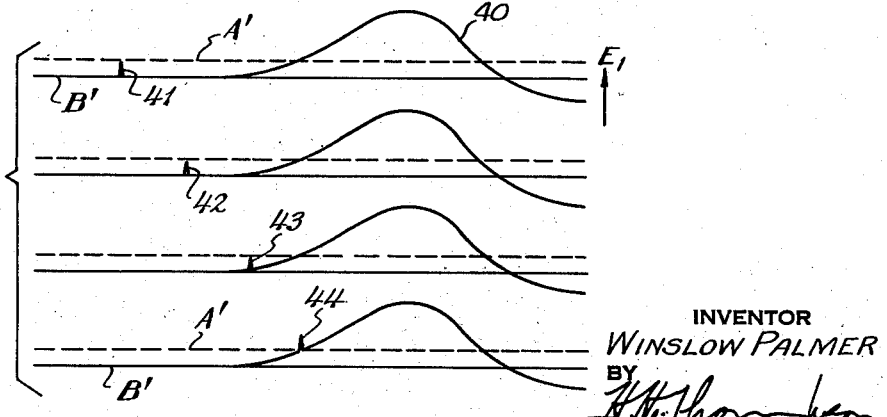
Figure 3:
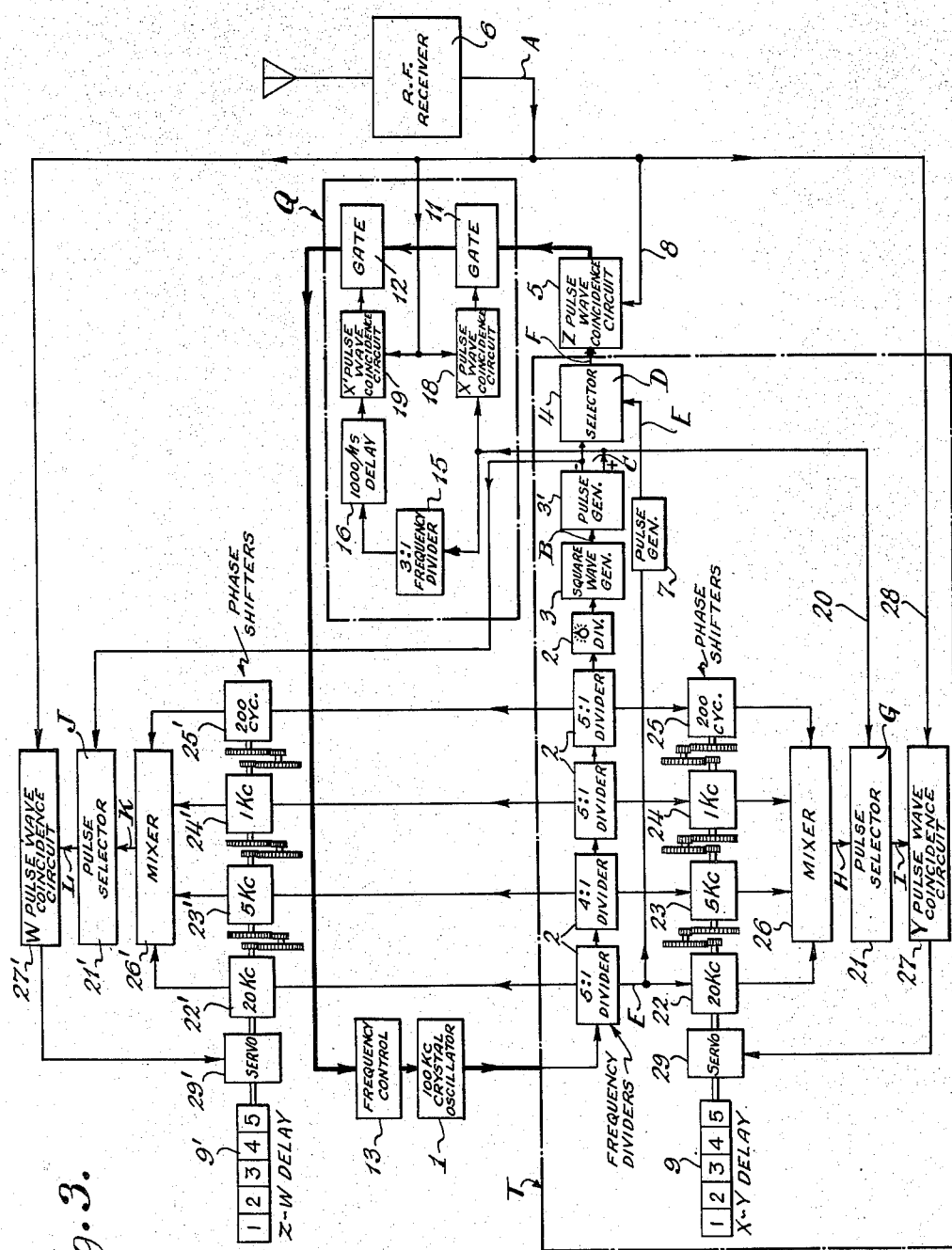

These and other objects of the invention will be apparent from the following specification and figures of which, Fig. 1 is a basic block diagram of a simplified embodiment of the invention;
Fig. 2 is a group of wave forms illustrative of the invention;
Fig. 3 is a schematic block diagram of an embodiment of the invention;
Fig. 4 is a schematic diagram of an embodiment of part of the invention;
Fig. 5 is a graph illustrative of the invention; and
Fig. 6 is a group of wave forms illustrative of the operation of Fig. 3.

In hyperbolic navigation systems, signals are transmitted from a pair of stations either simultaneously or with a predetermined delay and the loci of the points of constant time difference between the signals describe hyperbolas having the stations at their focal points. In the well known Low Frequency Loran triad systems, one station of each pair is common, so that there are only three operating locations. All the pulses are generally transmitted on the same radio frequency so that navigational fixes may be obtained without returning to a different frequency or repetition rate as in conventional Loran.

The technique of the present automatic system may be used for either conventional Loran or the newer but well known low frequency Loran triad system, but is here described in connection with the low frequency Loran triad system, as that has the more complicated sequence of pulses.

The invention resides in the combination for receiving incoming recurrent signals, for instance Loran signals, automatically identifying them and measuring the desired intervals between them. In the manual-visual Loran systems of the prior art, it has been necessary for an operator to perform the identification and measurement functions. Many of the individual components may be found in the prior art; for instance, the radio receiving portion, wave shaping and pulse forming circuits, as well as other conventional components such as oscillators, frequency control circuits and phase-shifting circuits. Other components such as a typical phase-shift timer, a typical frequency control loop and pulse wave coincidence circuits are disclosed in detail in my copending applications which are specifically referred to hereafter in the specification.

Fig. 1 illustrates the basic elements of the system of the invention. These elements are:

(1) An automatic frequency control loop comprising pulse wave coincidence circuit 5, frequency control 13 and oscillator 1. The loop functions to synchronize the locally generated pulses with the incoming pulses from receiver 6. Frequency control loops and pulse wave coincidence circuits of this type are described in detail in my copending application Serial No. 684,060, for a Pulse Wave Synchronization System, filed July 16, 1946, now Patent No. 2,574,494 granted November 13, 1951.

(2) Sequence testing circuits Q which break the frequency control loop when the synchronization is not in the proper sequence. A system of this type is disclosed in my copending application Serial No. 736,648, filed March 24, 1947 for a Sequence Testing Circuit.

(3) Interval timing means T which measures the interval between received signals. A system of this general type is disclosed in my copending application Serial No. 633,473 for Timing Apparatus, filed December 7, 1945.

Fig. 2A shows a single cycle of a Low Frequency Loran triad pulse sequence. Pulses X, X', and Z are transmitted from the common station. Pulse Y is transmitted from the second station and pulse W from the third station. The time intervals between pulses X—Y and Z—W determine two intersecting hyperbolas, which provide the navigational fix.

In order to synchronize on the pulses in correct sequence the "ghost" pulse X' is provided. It is merely the X pulse displaced in time 1,000 microseconds, for instance every third cycle. This identification "ghost" pulse removes the possibility of synchronizing to the pulses in an incorrect sequence, as there is a possibility of ambiguity, because the X and Z pulses are exactly one-half cycle apart.

Fig. 2 also contains a series of wave forms illustrative of the operation of Fig. 3 and which are keyed to the circuit of Fig. 3 by their identifying letters. The time scales of Fig. 2 have been somewhat exaggerated in some cases because of space considerations.

In the interests of disclosing the inventive combination without obscuring it with ordinary engineering detail, the number of elements in Fig. 3 has been kept to a minimum. For instance, there are many points at which sine waves or square waves are converted to pulses or vice versa. These well-known circuit details may be included in the major elements, and are mentioned in the specification.

Fig. 3 shows the system block diagram of an embodiment of the invention. A stable 100 kc. oscillator 1 drives a chain of frequency dividers 2, the outputs of which are connected to a direct reading phase delay measuring system T. The frequency dividers 2 and the phase delay measuring system may be the same type as disclosed in my copending application for Timing Apparatus, Serial No. 633,473, filed December 7, 1945.

The lowest frequency generated by the frequency dividers 2 drives square wave generator 3 which may be an Eccles Jordan circuit operating at the Loran repetition frequency, for instance 50 C. P. S. The last divider may be adjustable without disturbing the timing accuracy. Pulse generator 3' creates positive and negative pulses (Fig. 2C) in response to the square wave (Fig. 2B), and for proper operation they must be synchronized with the X pulse, as illustrated in Fig. 2. The negative pulses from pulse generator 3' are arranged to trigger 'on' a pulse selector 4 which may be a 'one shot' multivibrator, having a wave form (Fig. 2D) which is arranged to be triggered "off" by the next following timing pulse (Fig. 2E) received from frequency divider 2 and pulse generator 7. Selector 4 is arranged to have a pulse output (Fig. 2F) at the trailing edge of wave form (Fig. 2D), thus effectively selecting one of the timing pulses (Fig. 2E). This "selected" locally generated timing pulse (Fig. 2F) which is the locally generated Z pulse is then applied to a discriminator or pulse wave coincidence circuit 5, which is described in detail in Fig. 4.

The incoming Loran pulses are received by radio frequency receiver 6 and applied over lead 8 also to pulse wave coincidence circuit 5, so that coincidence between local Z trigger pulse (Fig. 2F) from the selector 4, and an incoming Loran Z pulse, generates a bias which is applied through gate circuits 11 and 12 to frequency controller 13 which controls the frequency of oscillator 1. This frequency control operation will be discussed in connection with Fig. 4.

The operation of relay or gate circuits 11 and 12 is arranged to insure the synchronization of local and received pulses in the proper sequence. The circuits through gates 11 and 12 will be completed when the positive local X pulses (Fig. 2C) and received X pulses coincide in detector 18, and the local X' pulses and received X' pulses coincide in detector 19. This is done in the following manner: The positive pulses of Fig. 2C from generator 3' are applied to a second pulse wave coincidence circuit 18. Referring to Fig. 2 it will be seen that this positive trigger (Fig. 2C) is exactly one-half of a Loran cycle after the negative trigger (Fig. 2C) pulse applied to wave coincidence circuit 5. Therefore, if coincidence circuit 5 synchronizes with the Z pulse then the coincidence circuit 18 will synchronize with the X pulse.

In order to insure that coincidence circuit 5 synchronizes with the Z pulse without ambiguity, use is made of the ghost pulse X' which occurs, for instance, every third cycle when the X pulse is displaced one thousand microseconds. The positive pulse (Fig. 2C) from generator 3' is applied through a 3:1 frequency divider 15 and a 1,000 microsecond delay circuit 16 to a third coincidence circuit 19 which is similar to coincidence circuit 18. This locally generated X' pulse will synchronize in detector 19 with the ghost X' pulse and complete the circuit through gate 12.

In the absence of a synchronization signal, oscillator 1, is adjusted so that the locally generated pulses will have a slightly lower frequency and will drift relative to the incoming pulses until synchronization in the proper sequence is established. The rate of drift may be adjusted by presetting the oscillator 1. This is discussed in connection with Fig. 4.

Therefore, referring to Fig. 2 it will be seen that only synchronization in the proper sequence of the pulses, local and incoming, X and X' will complete the circuits through gates 11 and 12. These sequence testing circuits apply the synchronizing frequency control voltage from coincidence circuit 5 to oscillator 1 to thereby lock in the local pulses with the incoming pulses.

The time measurement between the X and Y pulses (Fig. 2H) is made by generating a local Y pulse delayed a measurable amount from the local X pulse, so that it synchronizes with the incoming Loran Y pulse. The delay technique and apparatus is generally the same as described more fully in my aforementioned application Serial No. 633,473 for Timing Apparatus. It is done as follows: The positive pulses (Fig. 2C) from generator 3' are applied on lead 20, and trigger "on," pulse selector 21, which may be a "one shot" multivibrator similar to selector 4 and having a wave form (Fig. 2G). Selector 21 is arranged to be triggered "off" by the next occurring locally generated delayed pulse (Fig. 2H) from mixer 26. This delay is accomplished by the geared phase shifters 22, 23, 24 and 25. The phase shifter outputs are combined in mixer 26 and trigger "off" the pulse selector 21. Therefore, the selected pulse of Fig. 2H is the local Y pulse (Fig. 2I).

A suitable arrangement of the phase shifters and delay indicator 9 is given in my aforementioned application Serial No. 633,473. Generally selsyn units may be used as phase shifters and their output coils may be connected in series to mix the various frequency waves. Mixer 26 preferably has a pulse sharpening output stage to produce the pulses (Fig. 2H). The gear ratios between the phase shifters is proportional to the frequencies, so that the accuracy of the indicated phase delay reading is proportional to the highest frequency, and cyclic ambiguity at the frequency is resolved by the lower frequencies. An arrangement for producing a timing pulse from a group of phase shifted waves is disclosed in my copending application Serial No. 732,243, filed March 4, 1947 for a Phase Shift Timer.

The locally generated Y pulse (Fig. 2I) is applied to Y pulse wave coincidence circuit 27. If the locally generated Y pulse is not in synchronism with the Y pulse received over lead 28 from radio frequency receiver 6, then the pulse wave coincidence discriminator 27 will generate an error signal which operates servo 29 to adjust the phase shifters until the locally generated Y pulse and the received Y pulse are in synchronism. The total phase delay as read on calibrated indicator 9 then gives the desired Loran time delay between the X and the Y pulses indicated in Fig. 2H. The pulse wave coincidence circuit of Fig. 4 may be used for all the discriminators 5, 18, 19, 27 and 27' of Fig. 2. Indicator 9 may be a Veeder type counter geared to the phase shifters.

The Z—W time delay is measured in the same way by means of the parallel time measuring circuits comprising phase shifters 22' to 25', mixer 26', pulse selector 21', discriminator 27', servo 29' and indicator 9'. These circuits operate in the same manner as described for the measurement of the X—Y delay.

The W selector 21' is triggered "on" by the negative pulses, (Fig. 2C) from pulse generator 3', and is triggered "off" by the next succeeding pulse (Fig. 2K) from mixer 26'. Pulse selector 21' may be a one-shot multivibrator plus means for providing a pulse at the trailing edge of the multivibrator wave form (Fig. 2J), the same as pulse selectors 4 and 21. The selected pulse is the locally generated W pulse (Fig. 2L). The local and incoming W pulses are compared in pulse wave coincidence circuit 27', which drives the delay phase shifters by means of servo 29' to provide the Z—W delay on indicator 9'.

Fig. 4 illustrates a schematic diagram of a frequency control loop for the circuit of Fig. 1. It comprises pulse coincidence detector 5, reactance tube frequency controller 13, crystal control oscillator 1, frequency dividers 2, and square wave generator 3.

Figs. 5 and 6 are illustrative of the operation of Fig. 4. Fig. 5 is a diagram of the operating characteristic of tube 30 of pulse coincidence detector 5 showing two operating points of interest. Point A is the position of equal frequency of incoming and locally generated pulses. It provides an output $E_0$ at which the oscillator 1 is controlled to generate trigger pulses, through the frequency dividers 2, at exactly the Loran pulse repetition frequency. The other operating point B is the search position, and it provides an output $E_0$ which controls oscillator 1 at a slightly lower frequency, so that the locally generated triggers drift relative to the incoming Loran signals received through radio receiver 6.

Fig. 6 illustrates the relation between the Loran pulse 40 and the gradually drifting trigger pulses 41, 42, 43 and 44 of successive cycles. The line B' is that value of $E_1$ which will cause tube 30 to operate at the point B (Fig. 5) and the dotted line A' is that value of $E_1$ which causes tube 30 to operate at point A on its operating characteristic (Fig. 5).

Referring to Fig. 4, the Loran pulse input circuit of tube 30 comprises condenser 35 and resistor 36 which have a time constant somewhat greater than the length of a Loran pulse. Therefore, the incoming Loran pulses, noise and any other signals will average about the bias voltage at potentiometer 39.

The bias level of the potentiometer 39 is preset, so that tube 30 will normally operate at point B on its characteristic. Also, the frequency of oscillator 1 is preset as by variable inductor 14 so that the frequency of the local triggers applied to coincidence tube 30 is exactly the Loran repetition rate, when the tube 30 circuit operates at point A on its characteristic, in which condition tube 30 supplies exact synchronization control voltage to frequency control 13.

Condenser 38 and resistor 37 connected to the control grid of tube 30 comprise a differentiating circuit which generates triggers from the square wave output of square wave generator 3. Only the positive triggers shown are used to make tube 30 conduct momentarily and the negative triggers have no use. In the absence of triggers, tube 30 is normally cut off by voltage drop across resistor 39 caused by current through resistor 40 so that, in effect, the triggers momentarily sample the instantaneous amplitude of the incoming signal, whatever it may be.

The time constant of condenser 31 and resistor 32 in the plate circuit of tube 30 is chosen very large to provide a long term or integrating effect, thereby providing a stabilized average output $E_0$ in the event that the signals are momentarily interrupted or in the face of received noise. The purpose of the RC circuit comprising condenser 33 and the resistor 34 is to suppress undesirable oscillations in the frequency control loop.

The operation of the circuit of Fig. 4 is as follows: Incoming Loran pulses are supplied from radio frequency receiver 6 to the third grid of tube 30, and locally generated trigger pulses are supplied through the differentiating circuit 37 and 38 to the first grid of coincidence tube 30. In the absence of coincidence between the incoming pulses and the locally generated trigger pulses, as previously mentioned, the circuit parameters are chosen and potentiometer 39 set, so that the tube 30 operates at the search point B (Fig. 5) on its operating characteristic. In this condition the local trigger pulses gradually drift relative to the incoming Loran pulses as indicated in Fig. 6 by succeeding cycles, at equal intervals, of local triggers 41, 42, 43 and 44.

As the local triggers gradually drift into coincidence with the incoming Loran pulses (Fig. 6), the instantaneous values of $E_1$ at the instants of the trigger pulses, will increase due to the increasing amplitudes of the Loran pulses at the instants of sampling. Therefore, there will be recurrent increasing voltage drops across plate resistor 32 and output condenser 31 will charge up, due to the fact that the condition of coincidence causes these conditions to be recurrent.

It may be emphasized that the long term gradual change in output voltage $E_0$ due to coincidence, takes place in condenser 31, and does not take place in the grid circuit of tube 30 as the tube only conducts instantaneously when triggered. The average value of $E_1$ does not change but only the instantaneous values at the trigger instants.

The local trigger pulses are thereby increased in frequency to the exact Loran frequency in response to the increased $E_0$ and at the $E_0$ corresponding to point A (Fig. 5), are synchronized with the incoming Loran pulses. The output $E_0$ corresponding to point A (Fig. 5) controls frequency controller 13 and thereby the frequency of oscillator 1 to provide local pulses at exactly the Loran repetition frequency. Details of another similar synchronizer circuit are given in my copending application Serial No. 74,218, filed February 2, 1949 for a Synchronizer.

Therefore, it is seen that coincidence tube 30 is a pulse frequency discriminator which will insure synchronism of the incoming and locally generated pulses.

The pulse coincidence circuit 5 may also be used in the pulse coincidence circuits 18 and 19 whose outputs are connected to gate circuits 11 and 12. These gate circuits are preferably arranged to have a tolerance indicated by dotted lines O and P in Fig. 5, so that when the inputs to detectors 18 or 19 are in synchronism, i. e., within the tolerance, then the circuits through the gates 11 and 12 will be completed. The gates 11 and 12 may comprise an input amplifier stage and a sensitive relay with a tolerance about a preset operating potential equivalent to point A of Fig. 5. Therefore, if the voltage to the gate relay varies from point A more than the tolerance amount indicating lack of coincidence, the relay will open and break the frequency control circuit from detector 5 to frequency controller 13, returning the system to its searching condition. Stated in another way, in the absence of the proper synchronizing signals, all input signals to detector 18 which are of a random nature will average out, and the detector output will be that equivalent to point B of Fig. 5. However, if synchronization appears, its output will change to point A of Fig. 5 and as the output crosses the predetermined threshold, dotted line O, its associated relay will close and complete the circuit.

The pulse discriminator circuit of Fig. 3 may also be used in Y discriminator 27, and W discriminator 27', as its output is suitable to operate servos 9 and 9'. Conventional servo amplifiers and motors may be used. The servos 9 and 9' may be made to oprate about the level of the voltage $E_0$ corresponding to operating point A (Fig. 5) by providing a bucking voltage of this amount, so that the servo input will be plus or minus about zero voltage.

Another suitable pulse frequency coincidence circuit is disclosed in my copending application Serial No. 684,060, filed July 16, 1946, entitled Pulse Wave Synchronization System.

The invention is not limited to the Loran usage which was illustrated, but may be used wherever it is desired to synchronize a locally generated signal with an incoming signal. There are many such applications in television, navigation systems, remote control systems and oscillograph circuits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for measuring the difference in time between separate distinguishable recurring signals, said time measuring means comprising means responsive to the distinguishable feature of said signals, a reference oscillator, sequence gate means to synchronize said reference oscillator to one of said signals, and selective coincidence means to automatically synchronize a delayed portion of said reference oscillator output with another of said signals, whereby said delay provides a measure of the time between said signals.

2. Means for measuring the difference in time between separate recurring signals, said time measuring means comprising a reference oscillator, pulse coincidence detector means to synchronize said reference oscillator to one of said signals, and phase shifting means to automatically delay a portion of said reference oscillator output to synchronize with another of said signals, whereby said delay provides a measure of the time between said signals, and means to insure the proper sequence of synchronization of said pulses.

3. Means for receiving a plurality of recurrent signals of predetermined sequence, means to distinguish said signals, means to generate a local recurrent signal in synchronism with a particular one of said received signals, means to generate at least one other local recurrent signal synchronized with particular ones of said received signals including coincidence means and gate circuit means, and means to automatically measure the time delay between said local signals.

4. Means for receiving a plurality of recurrent signals of predetermined sequence; means to generate a local recurrent signal in synchronism with one of said received signals; means to generate at least one other local recurrent signal synchronized with another of said received signals; means to automatically measure the time delay between said local signals; and means to test the proper sequence of synchronization comprising pulse coincidence means responsive to said received and local pulses, and gate signal means responsive to said pulse coincidence means.

5. Means for receiving a plurality of recurrent signals of predetermined sequence, means to generate a local recurrent signal in synchronism with one of said received signals, means to generate a second local recurrent signal in synchronism with said first local signal, means to delay said second local signal so as to synchronize it with a second of said received signals and means to automatically measure said delay to thereby indicate the time interval between said two received signals.

6. Means for receiving a plurality of recurrent signals of predetermined sequence, means to generate a local recurrent signal in synchronism with one of said received signals, comprising signal coincidence means, frequency control means to control said local signal in response to said signal coincidence means and sequence responsive means to selectively control the operation of said frequency control means.

7. Means for receiving a plurality of recurrent signals of predetermined sequence, means to generate a local recurrent signal in synchronism with one of said received signals, comprising signal coincidence means, and frequency control means to control said local signal in response to said signal coincidence means, sequence responsive means to selectively control the operation of said frequency control means, means to generate a second local recurrent signal in synchronism with said first local signal, means to delay said second local signal so as to synchronize it with a second of said received signals and means to automatically measure said delay to thereby indicate the time interval between said two received signals.

8. Means for receiving a plurality of recurrent signals, means to generate a local recurrent signal in synchronism with one of said received signals, means to generate a second local recurrent signal in synchronism with said first local signal, means to phase shift said second local signal so as to synchronize it with a second of said received signals and means to measure said phase shift to thereby indicate the time interval between said two received signals.

9. Means for receiving a plurality of pulse signals from Loran type pulse transmitters, means to generate a first local recurrent signal in synchronism with a first of said received signals, means to generate a second local recurrent signal in synchronism with said first local signal, means to delay said second local signal so as to synchronize it with the second of said received signals and means to measure said delay to thereby indicate the Loran time interval between said two received signals, and means responsive to said received signals to correct the sequence of said local signals.

10. Pulse radio receiver means for receiving a plurality of signals, coincidence means to generate a first local recurrent signal in synchronism with a first of said received signals, sequence testing means to generate other local signals in correct synchronism with others of said received signals, and means to measure the delays between said local signals to thereby indicate the time intervals between said received signals.

11. In a system wherein separate recurrent signals of predetermined sequence are received, time interval measuring means, means to synchronize said time interval measuring means with said received signals in the proper sequence comprising signal coincidence means adapted to vary the frequency of said time interval measuring means, and gate circuit means responsive to said predetermined sequence.

12. In a system wherein separate recurrent signals are received, time interval measuring means, means to synchronize said time interval measuring means with said received signals in the proper sequence comprising signal coincidence means adapted to vary the frequency of said time interval measuring means and selective signal means responsive to said signal coincidence means to insure synchronization in the proper sequence.

13. Means for receiving a plurality of recurrent signals of predetermined sequence, means for generating a local signal in synchronism with one of said received signals, means to generate a second local signal in synchronism with said first local signal, means to delay said second local signal so as to synchronize with a second of said received signals and means to automatically measure said relay to thereby indicate the time interval between said first and second received signals, means to generate a third local signal in synchronism with a third of said received signals, means to generate a fourth local signal in synchronism with said third local signal and means to delay said fourth local signal so as to synchronize it with a fourth of said received signals and means to automatically measure said delay to thereby indicate the time interval between said third and fourth received signals.

14. In an automatic Loran receiving system, a receiver arranged to receive Loran pulses, an oscillator, a frequency discriminator responsive to said receiver and said oscillator, a frequency controller adapted to vary the frequency of said oscillator in response to said frequency discriminator, phase shifting means operatively connected to said oscillator and arranged to delay a portion of the output of said oscillator, a second frequency discriminator responsive to said receiver and to said phase shifter, a servo mechanism responsive to said second frequency discriminator and arranged to vary said phase shifters, and means to indicate the phase shift of said phase shifter.

15. In a system wherein separate recurrent signals of predetermined sequence are received, coincidence means, generator means responsive to said coincidence means to provide locally generated signals in synchronism with said received signals, gate circuit sequence testing means responsive to said predetermined sequence to modify said generator means to provide synchronization in said predetermined sequence, and an interval timer responsive to said received signals to indicate the interval between said received signals.

16. In a system wherein separate recurrent signals of predetermined sequence are received, first coincidence means, generator means responsive to said first coincidence means to provide locally generated signals in synchronism with said received signals, sequence testing means responsive to said predetermined sequence to modify said generator means to provide synchronization in said predetermined sequence, second coincidence means responsive to local and received signals, phase shifting means responsive to said second coincidence means, and indicator means connected to said phase shifting means to indicate said phase shift.

17. A receiver, a generator of local timing signals, first coincidence circuit means connected to said receiver and said generator and adapted to synchronize said generator with received signals, second coincidence circuit means connected to said receiver and said generator, and gate signal means responsive to said second coincidence means and adapted to selectively connect said first coincidence means to control the synchronization of said generator.

18. A receiver, a generator of local timing signals, first coincidence circuit means connected to said receiver and said generator and adapted to synchronize said generator with received signals, second and third coincidence circuit means connected to said receiver and said generator, gate signal means responsive to said second and third coincidence means and adapted to selectively connect said first coincidence means to control the synchronization of said generator.

References Cited in the file of this patent

UNITED STATES PATENTS

| | | |
|---|---|---|
| 2,403,626 | Wolff et al. | July 9, 1946 |
| 2,430,038 | Weitz | Nov. 4, 1947 |
| 2,442,692 | Holst et al. | June 1, 1948 |
| 2,444,445 | Isbister | July 6, 1948 |
| 2,445,361 | Mountjoy et al. | July 20, 1948 |
| 2,487,822 | McLamore et al. | Nov. 15, 1949 |
| 2,487,995 | Tucker | Nov. 15, 1949 |
| 2,497,513 | Paine et al. | Feb. 14, 1950 |

FOREIGN PATENTS

| | | |
|---|---|---|
| 577,824 | Great Britain | June 3, 1946 |

OTHER REFERENCES

Ser. No. 429,583, De France (A. P. C.), published June 15, 1943.